United States Patent [19]

Eckes et al.

[11] Patent Number: 4,812,492
[45] Date of Patent: Mar. 14, 1989

[54] AQUEOUS PIGMENT PREPARATION, AND THE USE THEREOF

[75] Inventors: Helmut Eckes, Eppstein/Taunus; Rainer Winter, Oberursel; Albert Münkel, Frankfurt am Main, all of Fed. Rep. of Germany

[73] Assignee: Hoechst Aktiengesellschaft, Frankfurt am Main, Fed. Rep. of Germany

[21] Appl. No.: 78,216

[22] Filed: Jul. 27, 1987

[30] Foreign Application Priority Data

Jul. 29, 1986 [DE] Fed. Rep. of Germany ....... 3625605

[51] Int. Cl.$^4$ ...................... C08L 75/08; C08L 75/06
[52] U.S. Cl. ...................... 523/351; 524/84; 524/90; 524/110; 524/190; 524/357; 524/407; 524/420; 524/430; 524/431; 524/432; 524/591; 524/839; 524/840
[58] Field of Search ............... 524/591, 389, 839, 840, 524/84, 190, 110, 420, 431, 430, 432, 407, 357, 90; 523/351

[56] References Cited

U.S. PATENT DOCUMENTS

| 3,905,929 | 9/1975 | Noll | 524/839 |
| 4,046,729 | 9/1977 | Scriven et al. | 524/591 |
| 4,066,591 | 1/1978 | Scriven et al. | 428/457 |
| 4,237,264 | 12/1980 | Noll et al. | 524/591 |
| 4,303,774 | 12/1981 | Nachtkamp et al. | 524/591 |
| 4,374,641 | 2/1983 | Burlone | 523/351 |
| 4,460,738 | 7/1984 | Frentzel et al. | 524/591 |
| 4,608,413 | 8/1986 | Nachtkamp et al. | 524/591 |

FOREIGN PATENT DOCUMENTS 1549458 8/1979 United Kingdom .

Primary Examiner—Lewis T. Jacobs

[57] ABSTRACT

Aqueous pigment preparations which contain (a) 5 to 80% by weight of a finely-divided inorganic and/or organic pigment, (b) 5 to 80% by weight of an aequeous polyurethane dispersion, (c) 2 to 80% by weight of water and (d) 0 to 50% by weight of an organic solvent.

5 Claims, No Drawings

AQUEOUS PIGMENT PREPARATION, AND THE USE THEREOF

The invention relates to concentrated, flowable, water-dilutable, alcohol-stable and storage-stable preparations of inorganic and/or organic pigments with polyurethane dispersions, and the use thereof for the preparation of printing inks.

The aqueous pigment preparations corresponding to the state of the art contain, besides suitable pigments, ionogenic and/or nonionogenic pigment dispersants and, generally, other auxiliaries, Such as wetting agents, antisettling agents, antifoaming agents and water-retaining agents. These pigment preparations are suitable, for example, for pigmenting house paints, aqueous flexographic printing inks, paper pulp or for pigment printing on textiles and printing on absorptive substrates. In the case of nonsorptive substrates, these preparations, due to the wetting agents, dispersants and water-retaining agents contained in them, lead to delay in drying and "setting-off of the printing ink", in which some of the print is transferred onto the rear of the film during winding-up of the web, and also to poor adhesion. A further disadvantage of these preparations is the poor alcohol tolerance, which leads to flocculation of the pigments and thus to a reduction in gloss and tinctorial strength.

The object was therefore to develop concentrated, flowable, water-dilutable, alcohol-stable and storage-stable pigment preparations which do not have the disadvantages mentioned, in particular poor adhesion and delay in drying. In order to achieve this, polyurethane dispersions which are built up as described, for example, in German Offenlegungsschrift No. 2,624,442 (GB Patent No. 1,549,458), were employed as dispersion auxiliaries in place of the conventional wetting agents, dispersants and water-retaining agents.

These binders are products of the polyaddition of a polyester or polyether diol and bishydroxymethylpropanoic acid with aliphatic or aromatic diisocyanates, these products being dispersed in water with neutralization and reacted with polyamines with chain lengthening to form ureapolyurethanes. Surprisingly, it has been found that the polyurethane dispersions mentioned have good dispersing properties for solids, in particular inorganic and organic pigments, besides the known good film-forming properties. With the aid of these polyurethane dispersions, pigment preparations can be prepared which can be diluted with large amounts of water, alcohols and/or glycol ethers without influencing the storage stability and are particularly suitable for the preparation of aqueous and/or aqueous alcoholic rotogravure, flexographic and screen printing inks.

Taking into account the amount ratios of pigment, aqueous polyurethane dispersion, water and solvent which may be present, the invention thus relates to pigment preparations which contain
  (a) 5–80% by weight of at least one finely-divided organic and/or inorganic pigment,
  (b) 5–80% by weight of an aqueous polyurethane dispersion,
  (c) 2–80% by weight of water, and
  (d) 0–50% by weight of an organic solvent.

"Finely-divided pigment" is to be understood here as pigments having an average particle size of 50–300 nm.

The polyurethane dispersions used as dispersion medium are shear- and temperature-stable, so that the preparation of the pigment preparations according to the invention can be carried out using conventional dispersing machines, such as stirred ball mills. The pigment preparations according to the invention are adjusted in tinctorial strength and viscosity by further addition of polyurethane dispersion, which serves as binder, water and organic solvent.

Suitable organic solvents which should be mentioned are primarily monohydric aliphatic alcohols having 1 to 4 carbon atoms, such as methanol, ethanol, n- and iso-propanols and n- and iso-butanols, or mixtures thereof.

The printing inks prepared using pigment preparations according to the invention, and the prints prepared therewith on nonsorptive substrates, are distinguished by extremely high gloss, high transparency, good adhesion to coated and non-coated metal foils and on various plastic films, and in addition by rapid drying.

Rapid film formation by evaporation is ensured by the relatively low content of volatile neutralizing agents (amines or ammonia) in the polyurethane dispersion. On the other hand, advantages in printability compared to conventional dispersions arise since, even when the printing ink has dried onto a printing cylinder (for example during machine stoppages), redissolution by subsequent fresh printing ink is ensured or cleaning is possible using an aqueous alcoholic solution and small amounts of N-methylpyrrolidone. The advantages compared to commercially available systems are the combination of good resolubility in the printing machine and the very good water- and soap-fastness of the dried printed film. Addition of commercially available crosslinking agents lead to further film hardening and thus to even better solvent resistance of prints.

The polyurethane dispersions mentioned are suitable as dispersants for solids, in particular pigments and fillers, in aqueous and aqueous/alcoholic media.

The suitability of the polyurethane dispersions described for the preparation of pigment preparations should be particularly emphasized. Such pigment preparations can contain inorganic and/or organic pigments. Suitable organic pigments are, for example, azo pigments, azamethines, azaporphines, quinacridones, flavanthrone, anthanthrone and pyranthrone pigments, derivatives of naphthalenetetracarboxylic acid, of perylenetetracarboxylic acid, and of thioindigo, laked pigments, such as Mg, Ca, Sr, Ba, Al, Mn, Co and Ni salts of dyestuffs containing acid groups, and corresponding pigment mixtures. Suitable inorganic pigments which should be mentioned are, for example, white and colored pigments, such as titanium oxide, zinc oxide, zinc sulfide, cadmium sulfide or selenide, iron oxides, chromium oxides, chromate pigments, mixed oxides of the elements aluminum, antimony, chromium, iron, cobalt, copper, nickel, titanium and zinc which are suitable as pigments, and blended pigments and carbon black.

Depending on the area of application, the solids, in particular pigments, can be dispersed in the polyurethane dispersions described alone or, in addition, with the aid of the polyurethane dispersions described, in water or aqueous/alcoholic media. The solid dispersions, such as, in particular, the pigment dispersions, can contain, in addition to the polyurethane dispersions described, further conventional additives, such as foam and viscosity regulators, antisettling agents, wetting agents and preservatives.

Preferred pigment preparations contain 5 to 80% by weight, preferably 10 to 60% by weight, of pigments, 5 to 80% by weight, preferably 10 to 70% by weight, of the polyurethane dispersions described, 2 to 80% by weight, preferably 10 to 70% by weight, of water, and 0 to 50% by weight, preferably 0 to 30% by weight, of solvents.

Depending on the grain hardness of the solids employed, the solid preparations are prepared, for example, using stirrers, dissolvers, rotor-stator mills, ball mills, stirred ball mills (sand or bead mills) and in high-speed mixers.

Solid preparations which contain the polyurethane dispersions described have a high stability and a high solids content with, at the same time, good rheological properties.

If organic pigments, inorganic pigments and/or carbon black are employed as solids, preparations are obtained which are suitable for pigmenting aqueous and/or aqueous/alcoholic rotogravure, flexographic or screen printing inks for sorptive and in particular, non-sorptive substrates.

In the following examples, parts denote parts by weight; percentage data and ratios relate to the weight.

Preparation of various polyurethane dispersions (A-E), which are employed in accordance with the examples given below for the preparation of pigment preparations according to the invention:

Dispersion A 100 parts of a polyester diol (prepared from 1 mole of adipic acid, 3 moles of isophthalic acid and 4.8 moles of hexane-1,6-diol, acid number (8) and 12.5 parts of bishydroxymethylpropionic acid were dissolved in 69.4 parts of N-methylpyrrolidone and reacted with hexamethylene 1,6-diisocyanate for 2 hours at 75° C. 11.8 parts of triethylamine were then added to the urethane prepolymer solution and, after about 15 minutes, the batch was run at a steady rate with vigorous stirring into 290 parts of demineralized water. When a uniform dispersion had been produced, 2.7 parts of diethylenetriamine were added dropwise. A virtually transparent polyurethane dispersion having a solids content of about 30% by weight was obtained.

Dispersion B 100 parts of a polyester diol (as for dispersion A), 30 parts of perhydrobisphenol A and 12.5 parts of bishydroxymethylpropionic acid were dissolved in 93.8 parts of methyl ethyl ketone and reacted with 57.6 parts of hexamethylene 1,6-diisocyanate for 2 hours at 75° C. The prepolymer batch was then added slowly with vigorous stirring to a solution of 11.8 parts of triethylamine in 390 parts of demineralized water. When a uniform dispersion had been produced, 4.6 parts of diethylenetriamine were added dropwise. A slightly opalescent polyurethane dispersion having a solids content of about 30% by weight was obtained.

Dispersion C 100 parts of a polyester diol (as for dispersion A), 10 parts of perhydrobisphenol A and 12.5 parts of bishydroxymethylpropionic acid were dissolved in 62.7 parts of N-methylpyrrolidone and reacted with 54.2 parts of isophorone diisocyanate for 2 hours at 75° C. The prepolymer solution was transferred slowly into a solution of 11.8 parts of triethylamine in 270 parts of demineralized water. With vigorous stirring, a dispersion was produced to which a solution of 2.44 parts of 1,2-diaminopropane in 21.9 parts of demineralized water was added dropwise. A white polyurethane dispersion containing 35% of solids was obtained.

Dispersion D 100 parts of a hydroxyl group-containing polyester (prepared from 3.5 moles of phthalic anhydride, 0.25 mole of benzoic acid, 0.09 mole of maleic anhydride, 3.0 moles of neopentyl glycol, 0.1 mole of trimethylolpropane and 0.8 mole of propane-1,2-diol, OH number 60) and 12.5 parts of bishydroxymethylpropionic acid were dissolved in 61.5 parts of N-methylpyrrolidone and reacted with 38.9 parts of isophorone diisocyanate for 2 hours at 75° C. After addition of 11.8 parts of triethylamine, the prepolymer solution was transferred into 220 parts of demineralized water, a dispersion being produced with vigorous stirring. A solution of 2.5 parts of diethylenetriamine in 10 parts of demineralized water was added dropwise, and a turbid polyurethane dispersion containing 35% of solids was obtained.

Dispersion E 100 parts of a polyester diol (as for dispersion A), 50 parts of polyethylene glycol (of molecular weight 400) and 12.5 parts of bishydroxymethylpropionic acid were dissolved in 94.7 parts of N-methylpyrrolidone and reacted with 76.2 parts of isophorone diisocyanate for 2 hours at 75° C. After addition of 11.8 parts of triethylamine, the batch was added slowly to 350 parts of demineralized water, a dispersion being produced with vigorous stirring. After dropwise addition of a solution of 4.7 parts of diethylenetriamine in 29 parts of demineralized water, a clear dispersion having a solids content of about 35% and a viscosity of 320 mPa.s at 20° C. was obtained.

EXAMPLE 1

150 parts of C.I. Pigment Blue 15:3 (Colour Index No. 74160) were stirred into 300 parts of the polyurethane dispersion described above under dispersion A, and 2 parts of demineralized water using a saw-tooth stirrer. The pigment suspension produced was dispersed for 60 minutes in a bead mill with the aid of Siliquarzit glass beads of diameter 1 mm. After addition of a further 48 parts of demineralized water, a very readily flowable, storage-stable pigment preparation was obtained.

EXAMPLE 2

125 parts of C.I. Pigment Yellow 17 (Colour Index No. 21105) were stirred into 250 parts of the polyurethane dispersion described above under dispersion C and 50 parts of i-propanol using a saw-tooth stirrer. The pigment suspension thus obtained was ground for 60 minutes in a 1 liter bead mill which was filled with 1000 parts of 1 mm Siliquarzit beads. The ground material warmed to 40° C. at a cooling water temperature of 25° C. After dilution with 75 parts of demineralized water, a very readily flowable, storage-stable pigment preparation was obtained.

EXAMPLE 3

300 parts of the polyurethane dispersion described above under dispersion B and 35 parts of demineralized water were placed in a 1 liter grinding container, and 1000 parts of Pigment Red 185 (Colour Index No. 12516) were stirred in using a saw-tooth stirrer. The pigment suspension thus obtained was ground for 80 minutes in a batch bead mill. After addition of a further 65 parts of demineralized water, a very readily flowable, storage-stable pigment preparation was obtained.

EXAMPLE 4

225 parts of the polyurethane dispersion described above under dispersion D and 20 parts of demineralized water were placed in a 1 liter grinding container, and 175 parts of a furnace black having an average particle size of 30 nm were stirred in with the dissolver disk running. The carbon black suspension obtained was ground for 40 minutes in a bead mill and diluted with the remaining 80 parts of demineralized water to form a readily flowable, storage-stable carbon black preparation.

EXAMPLE 5

135 parts of a furnace black having an average particle size of 30 nm were formed into a paste in a mixture of 180 parts of the polyurethane dispersion described above under dispersion E, 45 parts of ethanol and 30 parts of demineralized water, and the paste was ground for 40 minutes in a stirred batch ball mill. After addition of a further 60 parts of demineralized water, a very readily flowable, storage-stable carbon black preparation was obtained.

I. Preparation of the printing ink (polyurethane dispersion base)

In general, the following dilution was used to produce the processing viscosity of the printing ink:
- 55 parts of polyurethane dispersion (dispersion C, about 35% strength)
- 24 parts of ethanol
- 14 parts of i-propanol
- 7 parts of demineralized water.

The pigment preparations prepared according to Examples 1–5 can be mixed in any ratio using a high-speed stirrer with the dilution prepared. The mixing ratio depends on the tinctorial strength desired. The following combination arises for an approximately 6% strength pigmented printing ink:

| | |
|---|---|
| 24.0 parts | of pigment preparation based on polyurethane dispersion (pigment content 25%) |
| 76.0 parts | of polyurethane dispersion dilution |
| 100.0 parts | |

II. Comparison printing ink (acrylate resin base)

The following tests were carried out compared to a commercially available printing ink system comprising a water-dilutable, pasty pigment preparation corresponding to the state of the art and a water-soluble acrylate resin:
(a) wet rub resistance with water and a weakly alkaline soap solution
(b) drying test
(c) adhesive tape detachment test
(d) alcohol tolerance Before it was possible to carry out the test, it was necessary to modify the formulation of the commercially available ink. When using the same amounts of alcohol as shown below under point I., a high tendency towards flocculation was found. The approximately 40% strength aqueous acrylate resin was therefore diluted as follows:
- 55 parts of acrylate resin, about 40% strength
- 14 parts of ethanol
- 7 parts of i-propanol
- 24 parts of demineralized water The printing ink was then prepared as described under I.:

| | |
|---|---|
| 24.0 parts | of pigment preparation according to the prior art |
| 76.0 parts | of acrylate resin dilution |
| 100.0 parts | |

Concerning (a) In order to test the wet rub resistance, the finished printing inks were applied to a transparent polyethylene film using a 12 μm hand coater. After a brief ventilation period at between 40° and 80° C. in order to remove the remaining solvent as completely as possible, the films were tested in accordance with DIN 16524 using a Timperley RST instrument, once with water and once with a 1% strength soap solution.

TABLE I

| | | Wet rub resistance water | Wet rub resistance soap solution 1% strength |
|---|---|---|---|
| (I) | Polyurethane pigment preparation according to the invention + polyurethane dispersion | 1,500 strokes | 500 strokes |
| (II) | Commercially available pigment preparation + acrylate resin | 100 strokes | 25 strokes |

Concerning (b) The printing inks prepared under I. were applied to a transparent polyethylene film using a 24 μm hand coater. At intervals of 1 minute, the time for complete drying at room temperature was determined by means of finger prints. Drying was only fully complete when no finger print could be seen on the film surface. The polyurethane dispersions described under I. dried in a time between 15 and 30 minutes. The acrylate printing ink used as comparison was still not tack-free after more than 4 hours.

Concerning (c) The adhesion was tested by means of a so-called "adhesive tape detachment test". To this purpose, the ink was likewise applied to a polyethylene film which had been pretreated by corona discharge and which should have a minimum surface tension of 38 dyn.cm$^{-1}$. The test was carried out after a brief ventilation period of the finished prints at about 60° C. The adhesion of the polyurethane printing ink according to the invention was perfect, whereas the conventional acrylate ink detached completely or partly from the film surface.

Concerning (d) The respective pigment preparations and the associated binders were tested for their alcohol tolerance. To this purpose, each of the pigment preparations and the binders were mixed with 20, 30 and 50% of ethanol and allowed to stand for about 1 hour. In the case of the pigment preparations, it was determined by means of microscopic investigation whether flocculation had occurred. It became apparent that the commercially available pigment preparation was greatly flocculated at an alcohol content of 30%. In contrast, the pigment preparation prepared according to Example 5 was perfectly flocculation-stable up to an alcohol content of 50%. It was possible to assess the two binder solutions by means of their tendency towards turbidity. The acrylate solution was milkily turbid and greatly thickened from an alcohol content of 30%. In contrast, the polyurethane dispersion was clear to opaque and perfectly flowable up to an alcohol content of 50%.

We claim:

1. An aqueous pigment preparaton which contains (a) 5 to 80% by weight of a finely-divided inorganic and/or organic pigment having an average particle size of 50–300 nm, (b) 5 to 80% by weight of an aqueous polyurethane dispersion of a product of the polyaddition of a polyester or polyether diol and bishydroxmethylpropanoic acid with an aliphatic or aromatic diisocyanate, the product being dispersed in water with neutralization and reacted with a polyamine with chain extension to form a urea polymer, (c) 2 to 80 percent by weight of water and (d) 0 to 50% by weight of an organic solvent.

2. An aqueous pigment preparation as claimed in claim 1, wherein the organic pigment is an azo pigment, azamethine, azaporphine, quinacridone, flavanthrone, anthanthrone or pyranthrone or a derivative of naphthalenetetracarboxylic acid, of perylenetetracarboxylic acid or of thioindigo, or an Mg, Ca, Sr, Ba, Al, Mn, Co or Ni salt of a dyestuff containing acid groups, or a mixture thereof.

3. An aqueous pigment preparation as claimed in claim 1, wherein the inorganic pigment is titanium dioxide, zinc oxide, zinc sulfide, cadmium sulfide or selenide, an iron oxide, a chromium oxide, a chromate or a suitable mixed oxide of the elements aluminum, antimony, chromium, iron, cobalt, copper, nickel, titanium and zinc, or a blended pigment or carbon black.

4. An aqueous pigment preparation as claimed in claim 1, wherein the organic solvent is a monohydric aliphatic alcohol having 1 to 4 carbon atoms.

5. An aqueous and/or aqueous/alcoholic rotogravure, flexographic or screen printing ink for sorptive or nonsorptive substrates prepared from an aqueous pigment preparation in accordance with claim 1.

* * * * *

UNITED STATES PATENT AND TRADEMARK OFFICE
CERTIFICATE OF CORRECTION

PATENT NO. : 4,812,492

DATED : March 14, 1989

INVENTOR(S) : Helmut Eckes, et al

It is certified that error appears in the above-identified patent and that said Letters Patent is hereby corrected as shown below:

Claim 1, line 1, "preparaton" should read --preparation--;
    line 6, "bishydroxmethyl-propanoic acid" should read --bishydroxymethyl-propanoic acid--.

Signed and Sealed this

Fifth Day of June, 1990

Attest:

HARRY F. MANBECK, JR.

*Attesting Officer*    *Commissioner of Patents and Trademarks*